United States Patent
Jung et al.

(10) Patent No.: US 7,496,028 B2
(45) Date of Patent: Feb. 24, 2009

(54) APPARATUS AND METHOD FOR MINIMIZING PAPR IN AN OFDM COMMUNICATION SYSTEM

(75) Inventors: Ki-Ho Jung, Seoul (KR); Heung-Gyooun Ryu, Cheongju-si (KR); Sung-Ryul Yun, Chungcheongbuk-do (KR)

(73) Assignee: Samsung Electronics Co., Ltd. (KR)

( * ) Notice: Subject to any disclaimer, the term of this patent is extended or adjusted under 35 U.S.C. 154(b) by 1086 days.

(21) Appl. No.: 10/746,572

(22) Filed: Dec. 24, 2003

(65) Prior Publication Data
US 2004/0136314 A1   Jul. 15, 2004

(30) Foreign Application Priority Data
Dec. 24, 2002   (KR) .................. 10-2002-0083364

(51) Int. Cl.
  *H04J 11/00* (2006.01)
(52) U.S. Cl. .............. 370/208; 375/260; 375/259; 370/210
(58) Field of Classification Search .......... 370/210, 370/208; 375/259, 260
See application file for complete search history.

(56) References Cited

U.S. PATENT DOCUMENTS

| 6,925,128 | B2 * | 8/2005 | Corral ................ 375/260 |
| 6,954,505 | B2 * | 10/2005 | Gatherer et al. ........... 375/260 |
| 2002/0168013 | A1 * | 11/2002 | Attallah et al. ............. 375/259 |
| 2004/0008616 | A1 * | 1/2004 | Jung et al. ................. 370/203 |
| 2006/0115010 | A1 * | 6/2006 | Rog et al. .................. 375/260 |
| 2006/0193393 | A1 * | 8/2006 | Shen et al. ................. 375/260 |
| 2006/0250936 | A1 * | 11/2006 | Chen et al. ................. 370/208 |

* cited by examiner

*Primary Examiner*—Brian Nguyen
*Assistant Examiner*—Luat Phung
(74) *Attorney, Agent, or Firm*—The Farell Law Firm, PC

(57) ABSTRACT

A signal transmission apparatus for minimizing a PAPR in an OFDM communication system. A subband divider divides L information data subcarrier signals into M subband signals. An additional information inserter inserts into the L information data subcarrier signals P additional information subcarrier signals. A dummy sequence inserter inserts the dummy sequence into a subband in the position. An IFFT block initially generates first and second OFDM symbol signals using M dummy sequence-free subband signals and M dummy sequence-inserted subband signals. A controller determines a sign bit value and an address bit value of the additional information when a PAPR value of the first OFDM symbol signal exceeds a predetermined PAPR threshold, and then performs a control operation of inserting the dummy sequence into a subband in a position corresponding to the address bit value so that the second OFDM symbol signal is transmitted over a downlink.

36 Claims, 11 Drawing Sheets

| INPUT DATA D |||||||||
|---|---|---|---|---|---|---|---|---|
| 1 | ... | $\frac{L}{M}$ | $\frac{L}{M}+1$ | ... | $\frac{2L}{M}$ | ... | $\frac{(M-1)L}{M}+1$ ... | L |
| $D^{(1)}$ || $D^{(2)}$ || | ... || $D^{(M)}$ ||

FIG.2

| | INPUT DATA D |||||||
|---|---|---|---|---|---|---|---|
| 311 — | D1 | D2 | ... | D64 | D65 | D66 | ... | D128 |
| 313 — | D1 | D2 | ... | D64 | 0 | 0 | ... | 0 |
| 315 — | D65 | D66 | ... | D128 | 0 | 0 | ... | 0 |

FIG.3

| | | IFFT BLOCK INPUT X | | | | |
|---|---|---|---|---|---|---|
| SIGN BIT | ADDRESS BIT | | DIVIDED DATA D | | | |
| P | $A_m$ | 1 ... $\frac{L}{M}$ | $\frac{L}{M}+1$ ... $\frac{2L}{M}$ | ... | $\frac{(M-1)L}{M}+1$ ... L | |
| S | | $D^{(1)}$ | $D^{(2)}$ | ... | $D^{(M)}$ | |

$D^{(1)} \sim D^{(M-1)}$ : INFO DATA, $D^{(M)}$ : DUMMY SEQUENCE

FIG. 4

APPARATUS AND METHOD FOR MINIMIZING PAPR IN AN OFDM COMMUNICATION SYSTEM

PRIORITY

This application claims priority under 35 U.S.C. § 119 to an application entitled "Apparatus and Method for Minimizing PAPR in an OFDM Communication System" filed in the Korean Intellectual Property Office on Dec. 24, 2002 and assigned Serial No. 2002-83364, the contents of which are incorporated herein by reference.

BACKGROUND OF THE INVENTION

1. Field of the Invention

The present invention relates generally to a mobile communication system employing an orthogonal frequency division multiplexing (OFDM) scheme, and in particular, to an apparatus and method for minimizing a peak-to-average power ratio (PAPR).

2. Description of the Related Art

Currently, mobile communication systems are rapidly progressing from a $3^{rd}$ generation (3G) mobile communication system to a $4^{th}$ generation (4G) mobile communication system. The 4G mobile communication system is being standardized to secure efficient interworking between a wired communication network and a wireless communication network and providing a wire/wireless integrated service rather than a simple wireless communication service provided in the earlier generation mobile communication systems. Therefore, it is necessary to develop advanced technology capable of transmitting mass data, whose quantity approaches the capacity of a wire communication network, even in a wireless communication network.

Therefore, in the 4G mobile communication system, research is being conducted on an orthogonal frequency division multiplexing (OFDM) scheme for high-speed data transmission in wire/wireless channels. The OFDM scheme, as a scheme transmitting data using multiple carriers, is a kind of Multi-Carrier Modulation (MCM) scheme that converts a serial input symbol stream into parallel symbols and then modulates the converted parallel symbols with a plurality of orthogonal subcarriers, i.e., a plurality of subcarrier channels, before transmission.

In a transmitter of an OFDM communication system, input data is modulated with subcarriers through a scrambler, an encoder, and an interleaver. The transmitter provides a variable data rate, and its coding rate, interleaving size, and modulation scheme are determined depending on the data rate. Commonly, the encoder uses a coding rate of ½ and ¾, and an interleaver's size for preventing a burst error is determined according to the number of coded bits per symbol (NCBPS). QPSK (Quadrature Phase Shift Keying), 8PSK (8-ary Phase Shift Keying), 16QAM (16-ary Quadrature Amplitude Modulation), and 64QAM are used for the modulation scheme. A predetermined number of pilot subcarriers are added to a signal modulated with a predetermined number of subcarriers by the above components, and then created into one OFDM symbol through an IFFT (Inverse Fast Fourier Transform) block. A guard interval for removing inter-symbol interference (ISI) in a multipath channel environment is inserted into the OFDM symbol, and then, finally input to an RF (Radio Frequency) processor through a symbol mapper. The RF processor RF-processes the input signal and transmits the RF signal in the air.

In a receiver of the OFDM communication system, a reverse process of the transmitter's process is performed, and a synchronization process is added thereto. First, a process of estimating a frequency offset and a symbol offset of a received OFDM symbol using a preset training symbol must be performed. Thereafter, a guard interval-removed data symbol is restored through an FFT (Fast Fourier Transform) block into a predetermined number of subcarriers to which a predetermined number of pilot subcarriers are added. In addition, in order to cope with a path delay phenomenon on an actual wireless channel, an equalizer estimates a channel condition for a received channel signal and removes signal distortion on the actual wireless channel from the received channel signal. The data channel-estimated through the equalizer is converted into a bit stream, deinterleaved by a deinterleaver, and output as final data through a decoder for error correction and a descrambler.

The above-described OFDM scheme is characterized by maintaining orthogonality between subcarriers during transmission, thereby obtaining optimal transmission efficiency during high-speed data transmission. Moreover, since overlapped frequency spectrums are used, the OFDM scheme has high frequency efficiency, and is robust against frequency selective fading and multipath fading. Further, the OFDM scheme can reduce an influence of inter-symbol interference by using a guard interval, and makes it possible to design an equalizer using simple hardware. Further, the OFDM scheme is robust against impulse noises. Currently, the OFDM scheme having such advantages is actively applied to high-speed, high-capacity data communication systems, such as an IEEE (Institute of Electrical and Electronics Engineers) 802.16a communication system and an IEEE 802.16e communication system.

The OFDMA (Orthogonal Frequency Division Multiple Access) communication system must use a signal having a low peak-to-average power ratio (PAPR) in order to guarantee its normal system performance. The reason for using a signal with a low PAPR will be described below.

The OFDMA communication system, which is a multicarrier communication system, uses a plurality of carriers, i.e., a plurality of subcarriers, so orthogonality of each of the subcarriers is considered important. Therefore, a phase is set such that orthogonality should be kept between the subcarriers, and in a process of transmitting/receiving signals through the subcarriers, when the phase is changed, the subcarrier signals may overlap. In this case, a level of the signals overlapped due to the phase change deviates from a linear region of an amplifier included in the OFDMA communication system, making normal signal transmission/reception impossible. Therefore, the OFDMA communication system uses a signal having a minimum PAPR.

As stated above, PAPR minimization in the OFDM communication system is an important factor in improving system performance, so a large amount of research is being carried out on a scheme for minimizing the PAPR. The scheme for reducing the PAPR includes a clipping scheme, a block coding scheme, and a phase adjustment scheme. A description will be made herein below of the schemes for reducing the PAPR.

1) Clipping Scheme

In the clipping scheme, when a level of a signal exceeds a preset level, a signal component exceeding the preset level is clipped away to thereby reduce PAPR. Because the clipping scheme simply clips away the signal component exceeding the preset level, its implementation is very simple. However, the clipping scheme is disadvantageous in that in-band distortion occurs due to non-linear operation, increasing a bit error rate (BER), and inter-neighbor channel interference occurs due to out-band clipping noises.

2) Block Coding Scheme

In the block coding scheme, a coding scheme is applied to a redundancy subcarrier in order to reduce PAPR of all subcarrier signals. The block coding scheme, as it applies the coding scheme, has an error correction capability and further, can reduce PAPR without signal distortion. However, when the total number of subcarriers is large, its spectrum effect is very poor and a look-up table or a generation matrix increases in size, disadvantageously causing an increase in complexity.

3) Phase Adjustment Scheme

The phase adjustment scheme is classified into two schemes: a selective mapping (SLM) scheme and a partial transmit sequence (PTS) scheme. The SLM scheme multiplies the same length-N data by M statistically-independent length-N sequences, selects a sequence having a minimum PAPR among the M resultant sequences, and transmits the selected sequence. The PTS scheme divides a length-N data block into M subblocks, performs an (L+P)-point IFFT operation on each of the M subblocks, multiplies each of the M (L+P)-point IFFT-transformed subblocks by a phase parameter for minimizing PAPR, and then, sums up the multiplied results before transmission. Advantageously, the SLM scheme and the PTS scheme can efficiently reduce PAPR. However, an IFFT operation process for each of the M subblocks is added, undesirably causing an increase in complexity.

In the block coding scheme for reducing PAPR, a code rate is defined as $$R = \frac{k}{N} = \frac{k}{2^{k-1}}.$$

Here, R represents a code rate, N represents the total number of subcarriers for the OFDM communication system, and k represents the number of input information data bits. When the total number N of subcarriers for the OFDM communication system is 256 (N=256), a code rate in the block coding scheme has a very low value of 9/256=0.035. Accordingly, there is a demand for a scheme for reducing PAPR while resolving the low code rate and low bandwidth efficiency problems, which are major disadvantageous of the block coding in the OFDM communication system.

SUMMARY OF THE INVENTION

It is, therefore, an object of the present invention to provide an apparatus and method for minimizing PAPR in an OFDM communication system.

It is another object of the present invention to provide an apparatus and method for minimizing PAPR by inserting a dummy sequence in an OFDM communication system.

To achieve the above and other objects, there is provided a transmission apparatus for minimizing a peak-to-average power ratio (PAPR) in an orthogonal frequency division multiplexing (OFDM) communication system, comprising: a subband divider for dividing L information data subcarrier signals into M subband signals; an additional information inserter for inserting into the L information data subcarrier signals P additional information subcarrier signals comprised of a sign bit indicating whether a dummy sequence is inserted and an address bit indicating a position of a subband into which the dummy sequence is to be inserted, in response to a control signal; a dummy sequence inserter for inserting the dummy sequence into a subband corresponding to the position among the M subbands in response to a control signal; an inverse fast Fourier transform (IFFT) block for initially generating a first OFDM symbol signal by IFFT-transforming the P additional information subcarrier signals and M dummy sequence-free subband signals, and thereafter generating a second OFDM symbol signal by IFFT-transforming the P additional information subcarrier signals and M dummy sequence-inserted subband signals; a controller for determining a sign bit value and an address bit value of the additional information when a PAPR value of the first OFDM symbol signal exceeds a predetermined PAPR threshold, and then performing a control operation of inserting the dummy sequence into a subband in a position corresponding to the address bit value among the M subbands so that the second OFDM symbol signal is transmitted over a downlink; and a transmitter for transmitting a signal output from the IFFT block over the downlink.

To achieve the above and other objects, there is provided another transmission apparatus for minimizing a peak-to-average power ratio (PAPR) in an orthogonal frequency division multiplexing (OFDM) communication system, comprising: a subband divider for dividing L information data subcarrier signals into M subband signals; an additional information inserter for inserting into the L information data subcarrier signals P additional information subcarrier signals comprised of a sign bit indicating whether a dummy sequence is inserted and an address bit indicating a position of a subband into which the dummy sequence is to be inserted, in response to a control signal; a dummy sequence inserter for inserting the dummy sequence into the last subband to a subband corresponding to the position among the M subbands in response to a control signal; an inverse fast Fourier transform (IFFT) block for initially generating a first OFDM symbol signal by IFFT-transforming the P additional information subcarrier signals and M dummy sequence-free subband signals, and thereafter generating a second OFDM symbol signal by IFFT-transforming the P additional information subcarrier signals and M dummy sequence-inserted subband signals; a controller for determining a sign bit value and an address bit value of the additional information when a PAPR value of the first OFDM symbol signal exceeds a predetermined PAPR threshold, and then performing a control operation of inserting the dummy sequence into the last subband to a subband in a position corresponding to the address bit value among the M subbands so that the second OFDM symbol signal is transmitted over a downlink; and a transmitter for transmitting a signal output from the IFFT block over the downlink.

To achieve the above and other objects, there is provided a reception apparatus for minimizing a peak-to-average power ratio (PAPR) in an orthogonal frequency division multiplexing (OFDM) communication system, comprising: a receiver for receiving a radio frequency (RF) signal, converting the received RF signal into a baseband signal, and then FFT (Fast Fourier Transform)-transforming the baseband signal; an additional information detector for detecting, from the FFT-transformed signal, P additional information subcarrier signals comprised of a sign bit indicating whether a dummy sequence is inserted and an address bit indicating a position of a subband into which the dummy sequence is inserted; a dummy sequence remover for classifying L information data subcarrier signals excepting the additional information subcarrier signals into M subband signals, outputting the M subband signals when the sign bit indicates non-insertion of the dummy sequence, and removing the dummy sequence from a subband corresponding to the address bit when the sign bit indicates insertion of the dummy sequence; and an additional information remover for removing the P additional information subcarrier signals from a signal output from the dummy sequence remover.

To achieve the above and other objects, there is provided another reception apparatus for minimizing a peak-to-average power ratio (PAPR) in an orthogonal frequency division multiplexing (OFDM) communication system, comprising: a receiver for receiving a radio frequency (RF) signal, converting the received RF signal into a baseband signal, and then FFT (Fast Fourier Transform)-transforming the baseband signal; an additional information detector for detecting, from the FFT-transformed signal, P additional information subcarrier signals comprised of a sign bit indicating whether a dummy sequence is inserted and an address bit indicating a position of a subband into which the dummy sequence is inserted; a dummy sequence remover for classifying L information data subcarrier signals excepting the additional information subcarrier signals into M subband signals, outputting the M subband signals to the additional information remover when the sign bit indicates non-insertion of a dummy sequence, and removing the dummy sequence from the last subband to a subband corresponding to the address bit when the sign bit indicates insertion of the dummy sequence; and an additional information remover for removing the P additional information subcarrier signals from a signal output from the dummy sequence remover.

To achieve the above and other objects, there is provided a transmission method for minimizing a peak-to-average power ratio (PAPR) in an orthogonal frequency division multiplexing (OFDM) communication system, comprising the steps of: dividing L information data subcarrier signals into M subband signals; inserting into the L information data subcarrier signals P additional information subcarrier signals comprised of a sign bit indicating whether a dummy sequence is inserted and an address bit indicating a position of a subband into which the dummy sequence is to be inserted, in response to a control signal; inserting the dummy sequence into a subband corresponding to the position among the M subbands in response to a control signal; initially generating a first OFDM symbol signal by IFFT (Inverse Fast Fourier Transform)-transforming the P additional information subcarrier signals and M dummy sequence-free subband signals, and thereafter generating a second OFDM symbol signal by IFFT-transforming the P additional information subcarrier signals and M dummy sequence-inserted subband signals; and determining a sign bit value and an address bit value of the additional information when a PAPR value of the first OFDM symbol signal exceeds a predetermined PAPR threshold, and then performing a control operation of inserting the dummy sequence into a subband in a position corresponding to the address bit value among the M subbands so that the second OFDM symbol signal is transmitted over a downlink.

To achieve the above and other objects, there is provided another transmission method for minimizing a peak-to-average power ratio (PAPR) in an orthogonal frequency division multiplexing (OFDM) communication system, comprising the steps of: dividing L information data subcarrier signals into M subband signals; inserting into the L information data subcarrier signals P additional information subcarrier signals comprised of a sign bit indicating whether a dummy sequence is inserted and an address bit indicating a position of a subband into which the dummy sequence is to be inserted, in response to a control signal; inserting the dummy sequence into the last subband to a subband corresponding to the position among the M subbands in response to a control signal; initially generating a first OFDM symbol signal by IFFT (Inverse Fast Fourier Transform)-transforming the P additional information subcarrier signals and M dummy sequence-free subband signals, and thereafter generating a second OFDM symbol signal by IFFT-transforming the P additional information subcarrier signals and M dummy sequence-inserted subband signals; and determining a sign bit value and an address bit value of the additional information when a PAPR value of the first OFDM symbol signal exceeds a predetermined PAPR threshold, and then performing a control operation of inserting the dummy sequence into the last subband to a subband in a position corresponding to the address bit value among the M subbands so that the second OFDM symbol signal is transmitted over a downlink.

To achieve the above and other objects, there is provided further another transmission method for minimizing a peak-to-average power ratio (PAPR) in an orthogonal frequency division multiplexing (OFDM) communication system, comprising the steps of: (a) dividing an input data block into a plurality of sub-data blocks; (b) IFFT (Inverse Fast Fourier Transform)-transforming data in the divided sub-data blocks; (c) inserting a dummy sequence into one of the sub-data blocks when a PAPR value of the IFFT-transformed data exceeds a PAPR threshold, and generating a first block into which a sign bit, an address bit, a dummy sequence and data are inserted, by adding an additional information block including the sign bit indicating insertion of the dummy sequence and the address bit indicating a position of a dummy sequence-inserted block to the dummy sequence-inserted block and a data-inserted block; and (d) sequentially inserting dummy sequences into the sub-data blocks by repeating the steps (a) to (c) until a PAPR value of data obtained by IFFT-transforming data in the first block becomes less than the PAPR threshold.

To achieve the above and other objects, there is provided a reception method for minimizing a peak-to-average power ratio (PAPR) in an orthogonal frequency division multiplexing (OFDM) communication system, comprising the steps of: receiving a radio frequency (RF) signal, converting the received RF signal into a baseband signal, and then FFT (Fast Fourier Transform)-transforming the baseband signal; detecting, from the FFT-transformed signal, P additional information subcarrier signals comprised of a sign bit indicating whether a dummy sequence is inserted and an address bit indicating a position of a subband into which the dummy sequence is inserted; classifying L information data subcarrier signals excepting the additional information subcarrier signals into M subband signals; removing the P additional information subcarrier signals when the sign bit indicates non-insertion of the dummy sequence, and outputting the additional information-removed signal as an information data signal; and removing the dummy sequence from a subband corresponding to the address bit when the sign bit indicates insertion of the dummy sequence, removing the P additional information subcarrier signals, and outputting the result signal as an information data signal.

To achieve the above and other objects, there is provided another reception method for minimizing a peak-to-average power ratio (PAPR) in an orthogonal frequency division multiplexing (OFDM) communication system, comprising the steps of: receiving a radio frequency (RF) signal, converting the received RF signal into a baseband signal, and then FFT (Fast Fourier Transform)-transforming the baseband signal; detecting, from the FFT-transformed signal, P additional information subcarrier signals comprised of a sign bit indicating whether a dummy sequence is inserted and an address bit indicating a position of a subband into which the dummy sequence is inserted; classifying L information data subcarrier signals excepting the additional information subcarrier signals into M subband signals; removing the P additional information subcarrier signals when the sign bit indicates non-insertion of the dummy sequence, and outputting the additional information-removed signal as an information data signal; and removing the dummy sequence from the last subband to a subband corresponding to the address bit when the sign bit indicates insertion of the dummy sequence, removing the P additional information subcarrier signals, and outputting the result signal as an information data signal.

BRIEF DESCRIPTION OF THE DRAWINGS

The above and other objects, features, and advantages of the present invention will become more apparent from the following detailed description when taken in conjunction with the accompanying drawings in which:

FIG. 2 is a diagram schematically illustrating data division by the subband divider illustrated in FIG. 1;

FIG. 3 is a diagram schematically illustrating a format in which zero padding is applied to the data D divided by the subband divider illustrated in FIG. 1;

FIG. 4 is a diagram schematically illustrating an input signal format of the IFFT block illustrated in FIG. 1;

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

The present invention proposes an apparatus and method for minimizing a peak-to-average power ratio (PAPR) in a communication system employing an orthogonal frequency division multiplexing (OFDM) scheme (hereinafter referred to as an "OFDM communication system"). In particular, the present invention proposes an apparatus and method for minimizing PAPR by using a subband division (SD) scheme that divides an input signal into a plurality of subbands (or subblocks), transmits data through some of the divided subbands, and transmits a dummy sequence through the remaining subbands.

Figure 1:
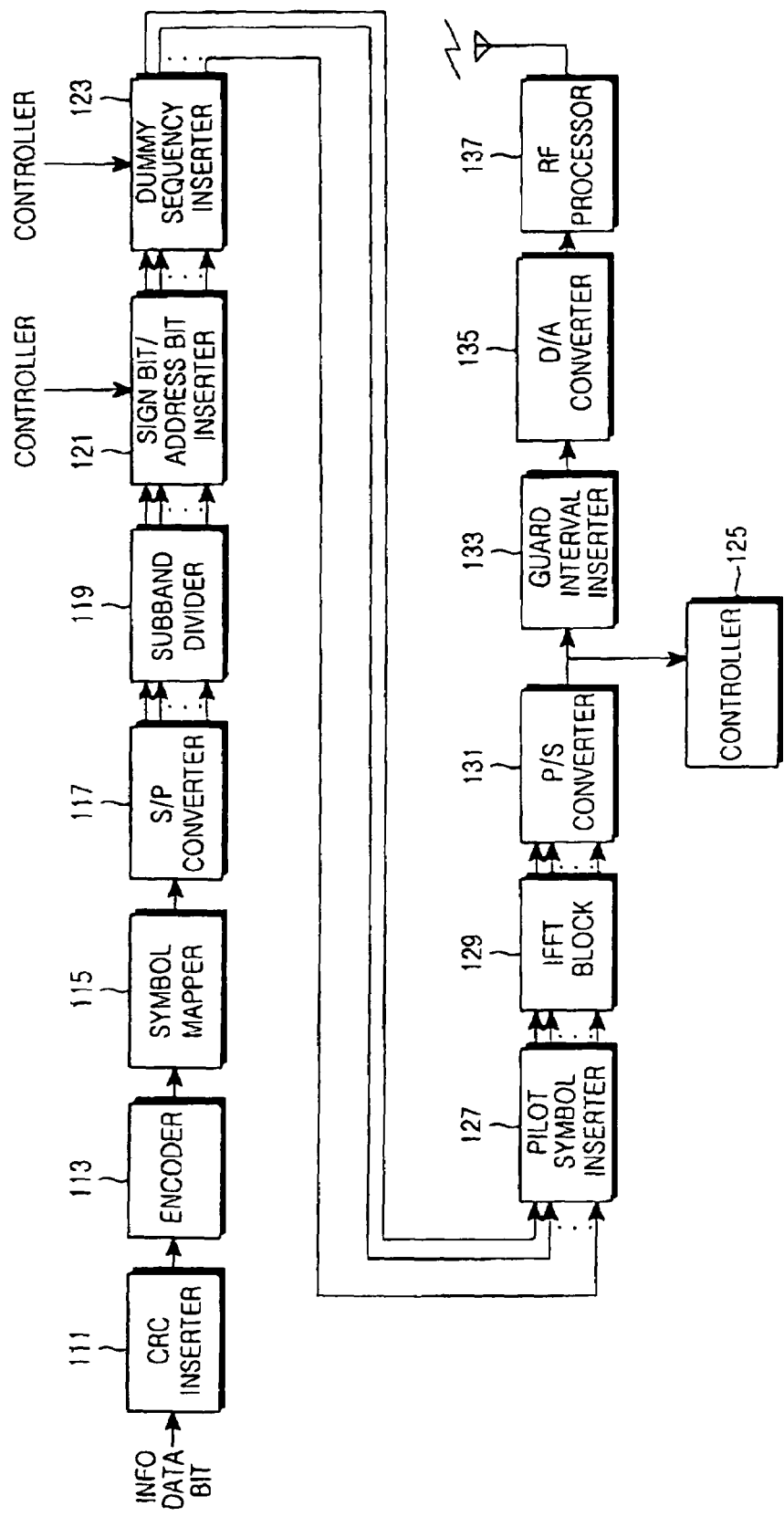
FIG. 1 is a block diagram schematically illustrating a transmitter structure of an OFDM communication system according to an embodiment of the present invention.

FIG. 1 is a block diagram schematically illustrating a transmitter structure of an OFDM communication system according to an embodiment of the present invention. Referring to FIG. 1, the transmitter comprises a CRC (Cyclic Redundancy Check) inserter 111, an encoder 113, a symbol mapper 115, a serial-to-parallel (S/P) converter 117, a subband divider 119, a sign bit/address bit inserter 121, a dummy sequence inserter 123, a controller 125, a pilot symbol inserter 127, an IFFT (Inverse Fast Fourier Transform) block 129, a parallel-to-serial (P/S) converter 131, a guard interval inserter 133, a digital-to-analog (D/A) converter 135, and an RF (Radio Frequency) processor 137.

When user data bits and control data bits to be transmitted are generated, the user data bits and control data bits are input to the CRC inserter 111. Herein, the user data bits and control data bits will be referred to as "information data bits." The CRC inserter 111 inserts CRC bits into the input information data bits, and provides its output to the encoder 113. The encoder 113 encodes a signal output from the CRC inserter 111 by a preset coding scheme, and provides its output to the symbol mapper 115. Here, the "coding scheme" can include a turbo coding scheme or a convolutional coding scheme having a preset coding rate. The symbol mapper 115 generates modulated symbols by modulating coded bits output from the encoder 113 by a preset modulation scheme, and provides its output to the S/P converter 117. Here, the "modulation scheme" can include QPSK (Quadrature Phase Shift Keying), QAM (Quadrature Amplitude Modulation), and 16QAM (16-ary Quadrature Amplitude Modulation). In addition, a signal output from the symbol mapper 115 will be referred to as "data D."

The data D is input to the S/P converter 117, which parallel-converts the data D and provides its output to the subband divider 119. The subband divider 119 divides a signal output from the S/P converter 117 into a predetermined number M of subband signals, buffers the M divided subband signals in its buffer (not shown), and then outputs them to the sign bit/address bit inserter 121. The sign bit/address bit inserter 121 inserts null data into the M subband signals output from the subband divider 119, and then provides its output to the dummy sequence inserter 123. In addition, the sign bit/address bit inserter 121, under the control of the controller 125, inserts sign bits and address bits according to a PAPR value of each of the M subband signals. A detailed description of this process will be made later.

The dummy sequence inserter 123 inserts a preset dummy sequence into a signal output from the sign bit/address bit inserter 121 under the control of the controller 125, and then provides its output to the pilot symbol inserter 127. A detailed description of the operation in which the dummy sequence inserter 123 inserts the dummy sequence under the control of the controller 125 will also be made later. The pilot symbol inserter 127 inserts pilot symbols into a signal output from the dummy sequence inserter 123, and then provides its output to the IFFT block 129.

The IFFT block 129 performs (L+P=N)-point IFFT on a signal output from the pilot symbol inserter 127, and then provides its output to the P/S converter 131. Here, L represents the number of information data subcarriers over which the information data is transmitted, and P represents the number of additional information subcarriers over which additional information described below is transmitted. The P/S converter 131 serial-converts a signal output from the IFFT block 129, and then provides its output to the controller 125 and the guard interval inserter 133. The controller 125 receives a signal output from the P/S converter 131 and determines whether its PAPR exceeds a preset PAPR threshold. If the PAPR of the signal output from the P/S converter 131 exceeds the PAPR threshold, communication efficiency of the OFDM communication system is reduced. Therefore, the controller 125 performs a control operation of sequentially inserting a dummy sequence from the very last subband D (M) and retransmitting a subblock D (M) replaced with a dummy sequence when the subblock D (M) is input to a buffer of an input data stage and current data is IFFT-transformed. Herein, the sign bits and the address bits will be referred to as "additional information," and a detailed description of a position where the additional information is inserted will be made later.

The guard interval inserter 133 inserts a guard interval signal into a signal output from the P/S converter 131, and then provides its output to the D/A converter 135. The guard interval is inserted in order to remove interference between an OFDM symbol to transmitted at a previous OFDM symbol time and a current OFDM symbol transmitted at a current OFDM symbol time when transmitting OFDM symbols in the OFDM communication system. In addition, the guard interval can be inserted by applying a "Cyclic Prefix" scheme or a "Cyclic Postfix" scheme. The Cyclic Postfix scheme copies predetermined last samples of a time-domain OFDM symbol and inserts them into an effective OFDM symbol, while the Cyclic Prefix scheme copies predetermined first samples of a time-domain OFDM symbol and inserts them into an effective OFDM symbol.

The D/A converter 135 analog-converts a signal output from the guard interval inserter 133, and then provides its output to the RF processor 137. The RF processor 137 includes a filter and a front-end unit, and RF-processes a signal output from the D/A converter 135 so that it can be transmitted in the air. Thereafter, the RF processor 137 transmits its output signal in the air through a transmission antenna.

FIG. 2 is a diagram schematically illustrating data division by the subband divider 119 illustrated in FIG. 1. Referring to FIG. 2, the subband divider 119 divides a signal output from the S/P converter 117 into a predetermined number M of subbands. It is assumed in FIG. 2 that the S/P converter 117 parallel-converts its input signal into L information data subcarrier signals. Therefore, each of the M subband signals $D^{(1)}$, $D^{(2)}, \ldots, D^{(M)}$ is comprised of L/M subcarrier signals. That is, the subband signal $D^{(1)}$ is comprised of $1^{st}, 2^{nd}, \ldots,$ $$\left(\frac{L}{M}\right)^{th}$$

subcarrier signals, and the subcarrier signal $D^{(2)}$ is comprised of $$\left(\frac{L}{M}+1\right)^{th}, \left(\frac{L}{M}+2\right)^{th}, \ldots, \left(\frac{2L}{M}\right)^{th}$$

subcarrier signals. In this manner, the last subband signal $D^{(M)}$ is comprised of $$\left(\frac{(M-1)L}{M}+1\right)^{th}, \left(\frac{(M-1)L}{M}+2\right)^{th}, \ldots, L^{th}$$

subcarrier signals. It will be assumed herein that the number of points of the IFFT block 129 shown in FIG. 1 is L+P, i.e., 128+P. Because the number of points of the IFFT block 129 is 128+P, the S/P converter 117 parallel-converts a signal output from the symbol mapper 115 into 128 information data subcarrier signals. The P point indicates a point corresponding to the additional information. The 128 subcarrier signals parallel-converted by the S/P converter 117 are input to the subband divider 119, and the subband divider 119 divides signals output from the S/P converter 117 into M subbands. For example, if M=4, the 128 subcarrier signals are divided into 4 subbands. That is, each of the 4 subbands is comprised of 32 subcarrier signals. Here, the number of subbands into which the subband divider 119 divides its input signals can be differently set according to a design of the OFDM communication system.

FIG. 3 is a diagram schematically illustrating a format in which zero padding is applied to the data D divided by the subband divider 113 illustrated in FIG. 1. Referring to FIG. 3, the data D, as described above, comprises 128 subcarrier signals $D1^{th}, D2^{th}, \ldots, D128^{th}$. In addition, it will be assumed in FIG. 3 that the number M of subbands is 2 (M=2). When the $D1^{th}, D2^{th}, \ldots, D128^{th}$ subcarrier signals are input to the subband divider 119, the subband divider 119 divides the $D1^{th}, D2^{th}, \ldots, D128^{th}$ subcarrier signals into two subbands. That is, a first subband is comprised of 64 subcarrier signals $D1^{th}, D2^{th}, \ldots, D63^{th}, D64^{th}$, and a second subband is comprised of 64 subcarrier signals $D65^{th}, D66^{th}, \ldots, D127^{th}, D128^{th}$ (see 311).

After dividing into 2 subbands, if it is necessary to perform zero padding on the divided subband signals under the control of the controller 125, the controller 125 performs a control operation of performing zero padding on the subcarrier signals corresponding to the second subband (see 313) and then performing zero padding on the subcarrier signals corresponding to the first subband (see 315). Here, the controller 125 controls (or orders) the subband divider 119 to perform zero padding on the corresponding subband, because when PAPR of a signal output from the P/S converter 131 exceeds a PAPR threshold, a dummy sequence must be inserted in sequence from the very last subband among the M subbands as described in conjunction with FIG. 1. Although PAPR reduction can be achieved with only the zero padding, i.e., a null sequence, it is preferable to use a complementary sequence as a dummy sequence to maximize the PAPR reduction effect. The reason for using a complementary sequence as a dummy sequence is because the complementary sequence shows a characteristic that after being subjected to IFFT process, its PAPR is generally noticeably lower than that of other sequences.

FIG. 4 is a diagram schematically illustrating an input signal format of the IFFT block 129 illustrated in FIG. 1. Referring to FIG. 4, an input signal X to the IFFT block 129 comprises sign bits, address bits, and a signal, i.e., the divided data D, output from the subband divider 119. The sign bits and the address bits will now be described herein below.

The sign bits indicate whether a dummy sequence is inserted in the subbands. S bits can be used as the sign bits. For example, when one bit is used as the sign bits, if the sign bit value is '−1', this indicates that the dummy sequence is not inserted, and if the sign bit value is '+1', this indicates that the dummy sequence is inserted.

The address bits indicate a position of a subband into which the dummy sequence is inserted, and because the number of subbands is M, $\log_2(M)=A_M$ bits can be used as the address bits. A value of the address bit indicates a position of a subband into which a dummy sequence is inserted. For example, if the address bit value is '1', this indicates that a dummy sequence is inserted into a first subband, or the last subband, among the M subbands. Because the dummy sequence is inserted from the last subband as stated above, the address bit value is counted from the position of the last subband. Therefore, the transmitter of the OFDM communication system additionally requires as many subcarriers as P, determined by adding up the number S of sign bits and the number $A_M$ of address bits, so the number of points of the IFFT block 129 becomes L+P. The sign bit value and the address bit value are determined under the control of the controller 125. It is assumed in FIG. 4 that the divided data D is mapped with actual information data in the subbands $D^{(1)}$ to $D^{(M-1)}$, and is mapped with a dummy sequence in the subband $D^{(M)}$. For example, in FIG. 4, the dummy sequence is inserted in the last subband.

A detailed description will now be made of the above-stated subband division and dummy sequence insertion operations with reference to mathematical expressions.

Equation (1) below represents input data D and an $m^{th}$ subband signal among M subband signals, when the number of subcarriers is L, i.e., the input data D is $D=\{D_1, D_2, \ldots, D_L\}$, and the input data D is divided into M subbands of $D^{(1)}$, $D^{(2)}, \ldots, D^{(M)}$.

$$D = \sum_{m=1}^{M} D^{(m)}, m = 1, 2, \ldots, M \quad (1)$$

$$D^{(m)} = \left\{ D_{(m-1)\frac{L}{M}+1}, D_{(m-1)\frac{L}{M}+2}, \ldots, D_{m\frac{L}{M}} \right\}$$

In Equation (1), $D^{(m)}$ represents subcarrier signals of an $m^{th}$ subband.

For example, if an OFDM communication system using an L=256 and M=4 subband division scheme has PAPR exceeding a PAPR threshold, a dummy sequence can be inserted into a fourth subband $D^{(4)}$. In this case, a length of the dummy sequence is L/M. Information data originally assigned to the $D^{(4)}$ is buffered in a buffer of the subband divider 119, and then transmitted at the next transmission time. If PAPR determined when a dummy sequence is inserted in the one subband, i.e., the fourth subband $D^{(4)}$, before being IFFT-transformed also exceeds the PAPR threshold, then a dummy sequence is inserted into an increased number of subbands, e.g., 2 subbands of the fourth and third subbands $D^{(4)}$ and $D^{(3)}$. In this case, a length of the dummy sequence is 2L/M. A length of the dummy sequence can be increased by a multiple of L/M, and its maximum length is limited to L/2, or the half of the number of subcarriers.

The subband division scheme proposed in the present invention employs a PAPR threshold for a reduction in a processing time, and applies a dummy sequence or zero padding only to the signal exceeding the PAPR threshold rather than applying the dummy sequence or zero padding to all input signals, thereby improving transmission capability while minimizing a processing time and the number of operations. In addition, the transmitter generates information indicating whether the division into subbands is performed and information on a position of a subband to which the dummy sequence is applied, as additional information, and transmits the generated additional information to a receiver so that the receiver can correctly demodulate the data. The additional information, as described above, refers to the sign bits and the address bits. The sign bit is defined as $S=\{+1,-1\}$. The sign bit S=−1 indicates that a dummy sequence is not inserted, and the sign bit S=+1 indicates that a dummy sequence is inserted.

When the division is made into M subbands, the address bits have $\log_2(M)=A_M$ bits, and $A_m$=m where m=1,2,…,M. Therefore, N symbols input to the IFFT block 129 can be expressed as $\{X_n, n=0,1, \ldots, N-1\}$. The N symbols are transmitted through N subcarriers $\{f_n, n=0,1, \ldots, N-1\}$ being orthogonal with each other in a frequency domain. Here, $f_n=n\Delta f$ and $\Delta f=1/NT$, where T represents a symbol interval and N represents the sum of P and L. Therefore, an OFDM symbol signal output from the P/S converter 131 can be expressed by Equation (2) below. Here, the OFDM symbol is a set of N symbols finally transmitted through the N subcarriers.

$$x(t) = \sum_{n=0}^{N-1} X_n e^{j2\pi f_n t}, 0 \leq t \leq NT \quad (2)$$

In addition, PAPR of the OFDM symbol signal defined in Equation (2) can be represented by Equation (3) below.

$$PAPR = \frac{\max|x(t)|^2}{E[|x(t)|^2]} \quad (3)$$

In Equation (3), $E[|x(t)|^2]$ represents an expected (or average) value of $|x(t)|^2$, and $\max|x(t)|^2$ represents a maximum value of $|x(t)|^2$.

Figure 5:
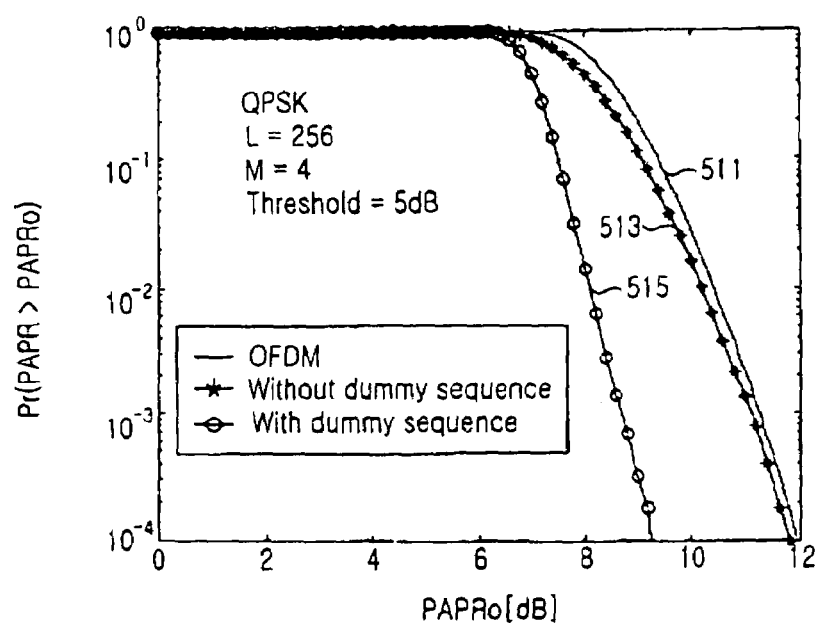
FIG. 5 is a graph illustrating CCDF performance in a case where the subband division scheme proposed in the invention is applied and CCDF performance in a normal case.

FIG. 5 is a graph illustrating CCDF (Code Domain Power and Complementary Cumulative Distribution Function) performance in a case where the subband division scheme proposed in the invention is applied and CCDF performance in a normal case. In the CCDF graph of FIG. 5, it is assumed that L=256, M=4, a PAPR threshold is 5 dB, and a size (or length) of a dummy sequence is a maximum of L/2=128. Making a comparison between a CCDF performance curve 511 in a general OFDM communication system in which the subband division scheme proposed in the present invention is not applied and CCDF performance curves 513 and 515 in a case where the subband division scheme proposed in the present invention is applied, it is illustrated that the CCDF performance in the case where the subband division scheme proposed in the present invention is applied is superior. In addition, comparing the CCDF performance curve 513 in a case where zero padding is used in applying the subband division scheme with the CCDF performance curve 515 in a case where a dummy sequence is used in applying the subband division scheme, it is shown that CCDF performance in the case where the dummy sequence is used is superior. That is, when the CCDF performance curve 513 is compared with the CCDF performance curve 515 in terms of CCDF performance with probability of $10^{-4}$, it is shown that the CCDF performance in the case where the dummy sequence is used is superior by about 2.6 [dB] to the CCDF performance in the case where the zero padding is used.

Figure 6:
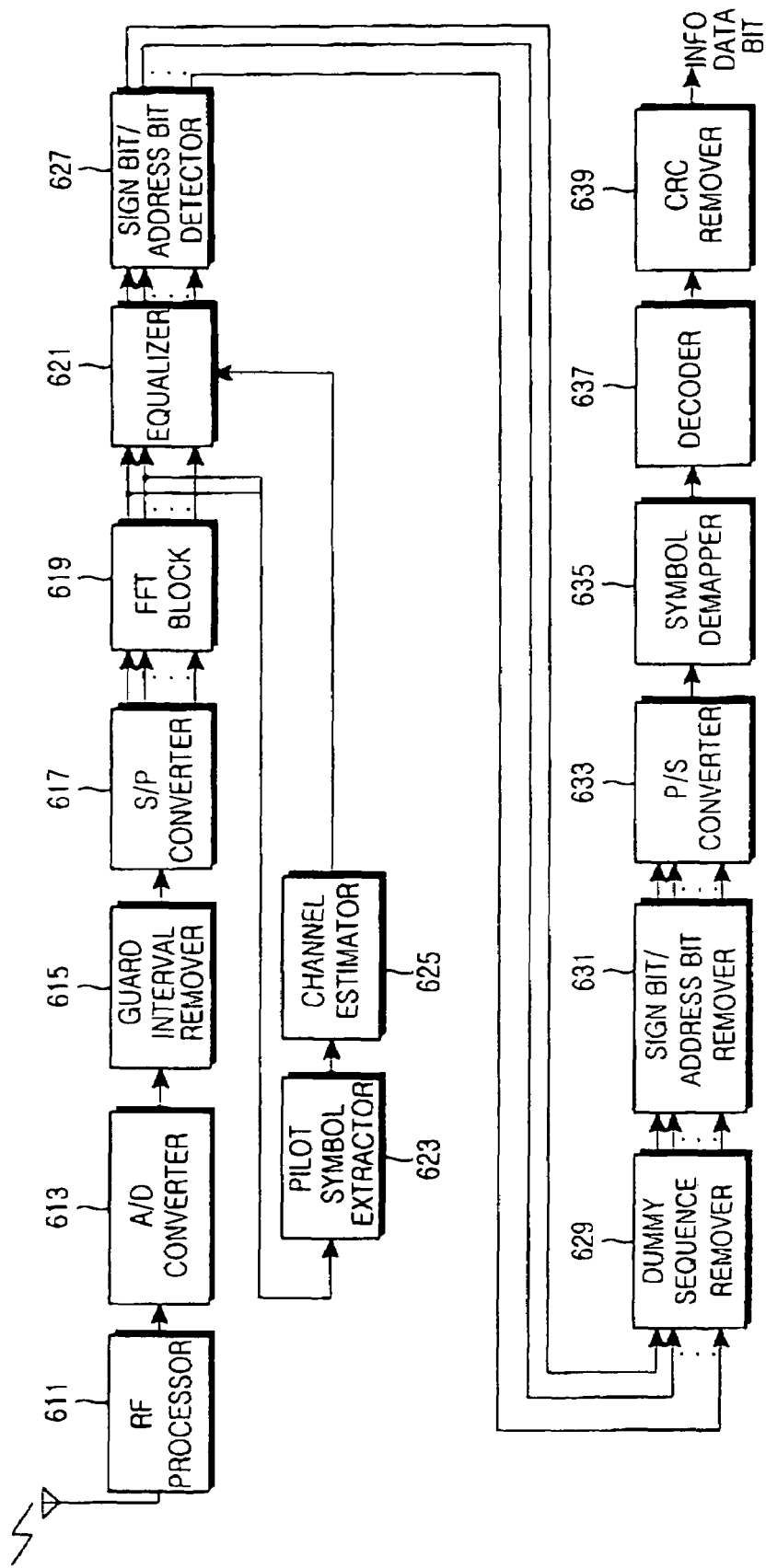
FIG. 6 is a block diagram schematically illustrating a receiver structure of an OFDM communication system according to an embodiment of the present invention.

FIG. 6 is a block diagram schematically illustrating a receiver structure of an OFDM communication system according to an embodiment of the present invention. Referring to FIG. 6, the receiver comprises an RF processor 611, an analog-to-digital (A/D) converter 613, a guard interval remover 615, an S/P converter 617, an FFT (Fast Fourier Transform) block 619, an equalizer 621, a pilot symbol extractor 623, a channel estimator 625, a sign bit/address bit detector 627, a dummy sequence remover 629, a sign bit/address bit remover 631, a P/S converter 633, a symbol demapper 635, a decoder 637, and a CRC remover 639.

A signal transmitted by the transmitter is received at the receiver via a reception antenna after experiencing a multi-path channel and getting noises therethrough. The signal received via the reception antenna is input to the RF processor 611, which down-converts the signal received via the reception antenna into an IF (Intermediate Frequency) signal, and provides its output to the A/D converter 613. The A/D converter 613 converts an analog signal output from the RF processor 611 into a digital signal, and provides its output to the guard interval remover 615.

The guard interval remover 615 removes a guard interval signal from a signal output from the A/D converter 613, and provides its output to the S/P converter 617. The S/P converter 617 parallel-converts a serial signal output from the guard interval remover 615, and provides its output to the FFT block 619. The FFT block 619 performs an N-point FFT operation, and provides its output to the equalizer 621 and the pilot symbol extractor 623. Signals output from the FFT block 619 are N subcarrier signals, and the N subcarrier signals are comprised of subcarriers including P additional information bits, i.e., sign bits and address bits, and subcarriers including L information data bits. The equalizer 621 channel-equalizes a signal output from the FFT block 619, and provides its output to the sign bit/address bit detector 627.

The sign bit/address bit detector 627 detects sign bits and address bits from the P subcarrier signals output from the equalizer 621, and provides its output to the dummy sequence remover 629. By detecting the sign bits and the address bits, the sign bit/address bit detector 627 can determine whether a dummy sequence is inserted in the subbands, and also determine a subband into which the dummy sequence is inserted, among the divided subbands.

The dummy sequence remover 629 receives a signal output from the sign bit/address bit detector 627, removes the dummy sequence from a corresponding subband, and then provides its output to the sign bit/address bit remover 631. The sign bit/address bit remover 631 removes the sign bits from the dummy sequence-removed signal, and provides its output to the P/S converter 633. The P/S converter 633 serial-converts a parallel signal output from the sign bit/address bit remover 631, and provides its output to the symbol demapper 635.

The signal output from the FFT block 619 is input to the pilot symbol extractor 623, and the pilot symbol extractor 623 extracts pilot symbols from the signal output from the FFT block 619, and outputs the detected pilot symbols to the channel estimator 625. The channel estimator 625 performs channel estimation using the pilot symbols and outputs the channel estimation result to the equalizer 621.

The symbol demapper 635 demodulates a signal output from the P/S converter 633 by a demodulation scheme corresponding to the modulation scheme applied in the transmitter, and then provides its output to the decoder 637. The decoder 637 decodes a signal output from the symbol demapper 635 by the decoding scheme corresponding to the coding scheme applied in the transmitter, and then provides its output to the CRC remover 639. The CRC remover 639 extracts CRC bits from a signal output from the decoder 637, and outputs information data bits transmitted by the transmitter.

"Transmission efficiency" refers to a ratio of the number of subcarriers over which pure information data is transmitted, to the total number of subcarriers. In order to describe transmission efficiency of the subband division scheme, it will be assumed that the number of subcarriers over which the information data is transmitted is L, the number of subbands is M, and there is an M=2 OFDM communication system. In this case, the number of subcarriers for transmitting the sign bits and the address bits is P as described above. Therefore, the total number of subcarriers in the OFDM communication system becomes N.

It will be assumed herein that the OFDM communication system transmits T (=A+B) data blocks for a predetermined time. Here, A represents the number of blocks having a PAPR lower than the PAPR threshold, and B represents the number of blocks having a PAPR exceeding the PAPR threshold. In this case, transmission efficiency of the OFDM communication system employing the subband division scheme can be represented by Equation (4).

$$\text{Transmission efficiency} = \frac{(A \cdot L + B \cdot 1/2 \cdot L)}{T \cdot (L+P)} = \frac{(A + 1/2 \cdot B) \cdot L}{T \cdot N} \; [\%] \quad (4)$$

A range between a maximum value and a minimum value of the transmission efficiency based on the PAPR threshold can be defined as in Equation (5) below.

$$\frac{1/2 \cdot B \cdot L}{T \cdot N} \leq \text{Transmission efficiency} \leq \frac{A \cdot L}{T \cdot N} \; [\%] \quad (5)$$

In Equation (5), the minimum value of the transmission efficiency occurs when a PAPR of all blocks exceeds the PAPR threshold (A=0, B=T), and the maximum value of the transmission efficiency occurs when a PAPR of all blocks is lower than the PAPR threshold (A=T, B=0). In addition, Equation (5) can be rewritten as Equation (6).

$$\frac{1/2 \cdot L}{N} \leq \text{Transmission efficiency} \leq \frac{L}{N} \; [\%] \quad (6)$$

In addition, Table 1 below illustrates transmission efficiency of the OFDM communication system employing the subband division scheme proposed in the present invention.

TABLE 1

| | | | |
|---|---|---|---|
| No. of information data subcarriers (L) | 256 | 256 | 256 |
| No. of subbands (M) | 4 | 8 | 16 |
| No. of additional info sub carriers (P) | 3 | 4 | 5 |
| Total No. of subcarriers (N = L + P) | 259 | 260 | 261 |
| Maximum Tx efficiency [%] | 98.8 | 98.5 | 98.1 |
| Minimum Tx efficiency [%] | 49.4 | 49.2 | 49.0 |

Figure 7:
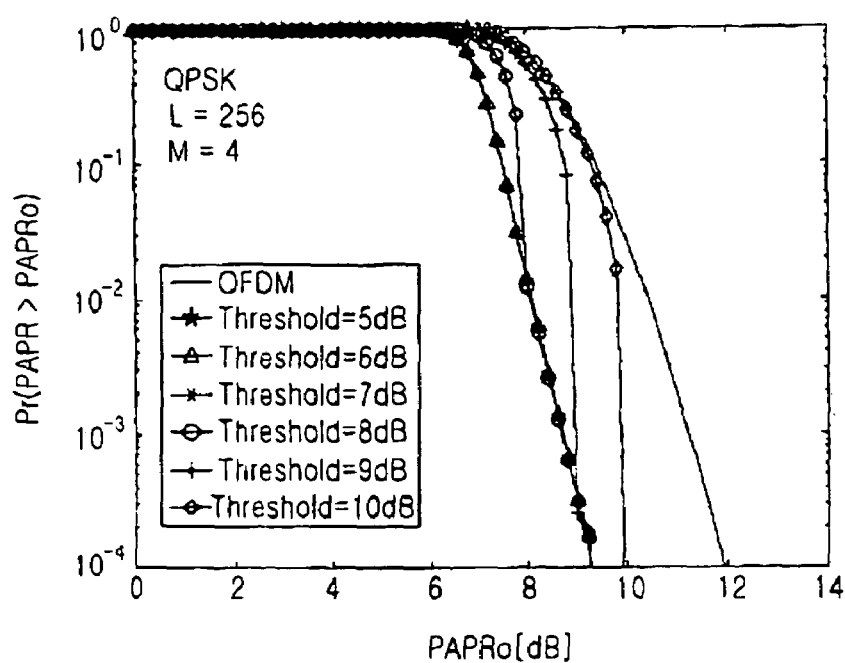
FIG. 7 is a graph illustrating CCDF performance based on a PAPR threshold in a case where L=256, M=4, and QPSK is applied in a subband division scheme according to an embodiment of the present invention.

FIG. 7 is a graph illustrating CCDF performance based on a PAPR threshold in a case where L=256, M=4 and QPSK is applied in a subband division scheme according to an embodiment of the present invention. In the CCDF graph of FIG. 7, it is assumed that L=256, M=4, QPSK is applied, and a size of a dummy sequence is a maximum of L/2=128. As illustrated in FIG. 7, it can be noted that a reduction in the PAPR threshold leads to a reduction in PAPR of the OFDM communication system. That is, it can be understood that a decrease in the PAPR threshold contributes to an improvement in PAPR performance of the OFDM communication system.

Figure 8:
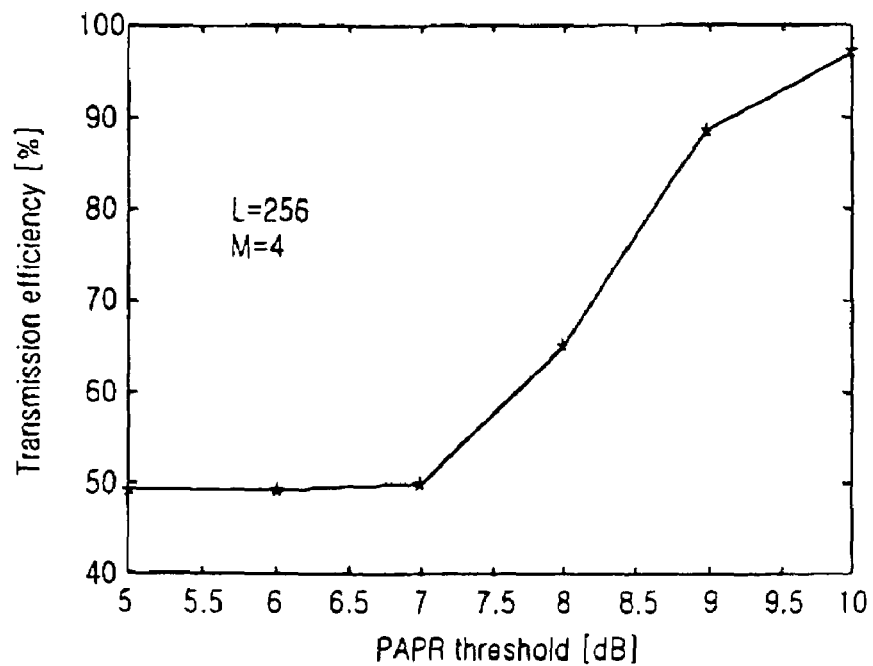
FIG. 8 is a graph illustrating CCDF performance based on a PAPR threshold in a case where L=256 and M=4 in a subband division scheme according to an embodiment of the present invention.

FIG. 8 is a graph illustrating CCDF performance based on a PAPR threshold in a case where L=256 and M=4 in a subband division scheme according to an embodiment of the present invention. In the CCDF graph of FIG. 8, it is assumed that L=256, M=4, and a size of a dummy sequence is a maximum of L/2=128. In FIG. 8, it can be noted that an increase in the PAPR threshold leads to an increase in transmission efficiency of the OFDM communication system. However, because an increase in the PAPR threshold indicates high possibility that normal signal transmission/reception will become impossible, it is not preferable to excessively increase the PAPR threshold in order to increase the transmission efficiency.

Figure 9:
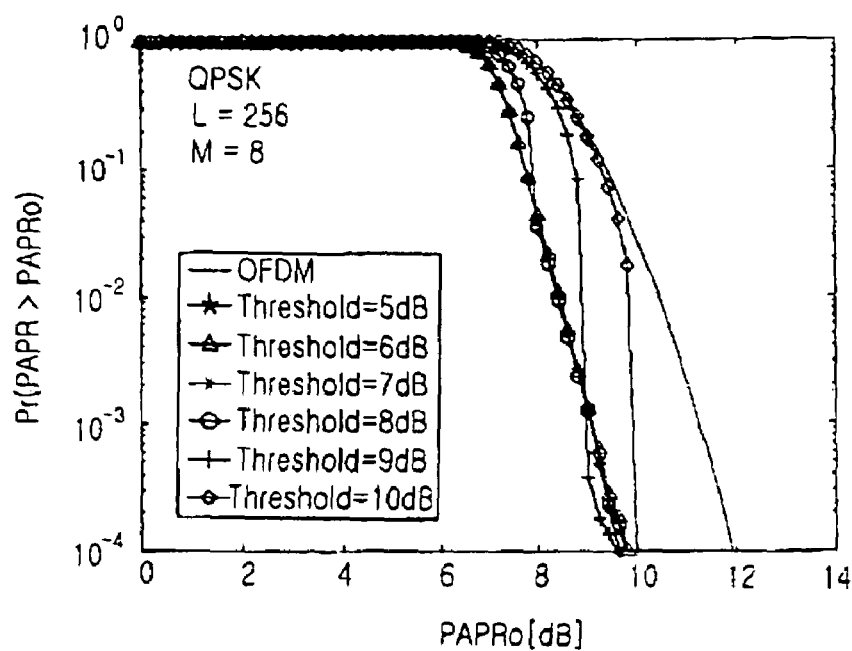
FIG. 9 is a graph illustrating CCDF performance based on a PAPR threshold in a case where L=256 and M=8 in a subband division scheme according to an embodiment of the present invention.

FIG. 9 is a graph illustrating CCDF performance based on a PAPR threshold in a case where L=256 and M=8 in a subband division scheme according to an embodiment of the present invention. In the CCDF graph of FIG. 9, it is assumed that L=256, M=8, and a size of a dummy sequence is a maximum of L/2=128. It can be noted that an increase in the PAPR threshold leads to a reduction in PAPR of the OFDM communication system. That is, it can be understood that an increase in the PAPR threshold contributes to a decrease in a transmission/reception error rate of the OFDM communication system.

Figure 10:
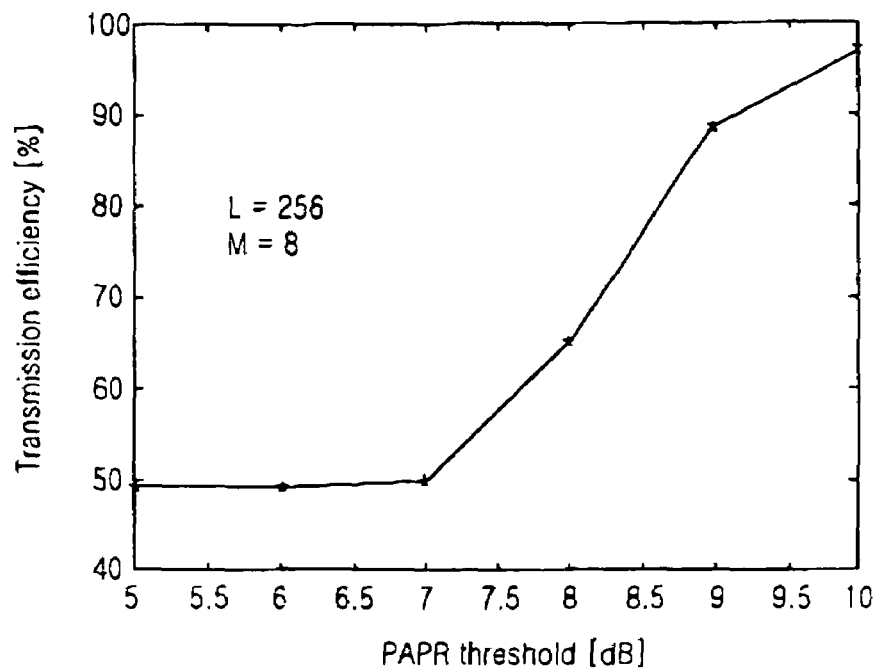
FIG. 10 is a graph illustrating CCDF performance based on a PAPR threshold in a case where L=256 and M=8 in a subband division scheme according to an embodiment of the present invention.

FIG. 10 is a graph illustrating CCDF performance based on a PAPR threshold in a case where L=256 and M=8 in a subband division scheme according to an embodiment of the present invention. In the CCDF graph of FIG. 10, it is assumed that L=256, M=8, and a size of a dummy sequence is a maximum of L/2=128. As illustrated in FIG. 10, it can be noted that an increase in the PAPR threshold leads to an increase in transmission efficiency of the OFDM communication system. However, because an increase in the PAPR threshold indicates high possibility that normal signal transmission/reception will become impossible, it is not preferable to excessively increase the PAPR threshold in order to increase the transmission efficiency.

It is possible to detect an optimal PAPR threshold that secures high transmission efficiency while reducing PAPR, taking into consideration the above-stated relations between a PAPR threshold and transmission efficiency for various L and M. Table 2 below illustrates PAPR reduction performance and transmission efficiency at a PAPR threshold having optimal performance. Generally, in implementing an OFDM communication system, the M and the PAPR threshold must be appropriately selected taking the PAPR reduction and transmission efficiency into account. From the simulation results, it is noted that the subband division scheme is superior in transmission efficiency to the block coding scheme. Because a code rate of the block coding is $R=k/N=k/2^{k-1}$, a code rate of the block coding scheme in Table 2 has a very low value of 9/256=0.035.

TABLE 2

| | | |
|---|---|---|
| No. of information data subcarriers (L) | 256 | 256 |
| No. of subbands (M) | 4 | 8 |
| No. of additional information subcarriers (P) (sign bits + address bits) = $1 + [\log_2(M)]$ | 3 | 4 |
| Total No. of subcarriers (N = L + P) | 259 | 260 |
| PAPR threshold [dB] | 9 | 9 |
| PAPR ($10^{-4}$) [dB] | 9.25 | 9.61 |
| Transmission efficiency [%] | 88.81 | 88.44 |

Figure 11:
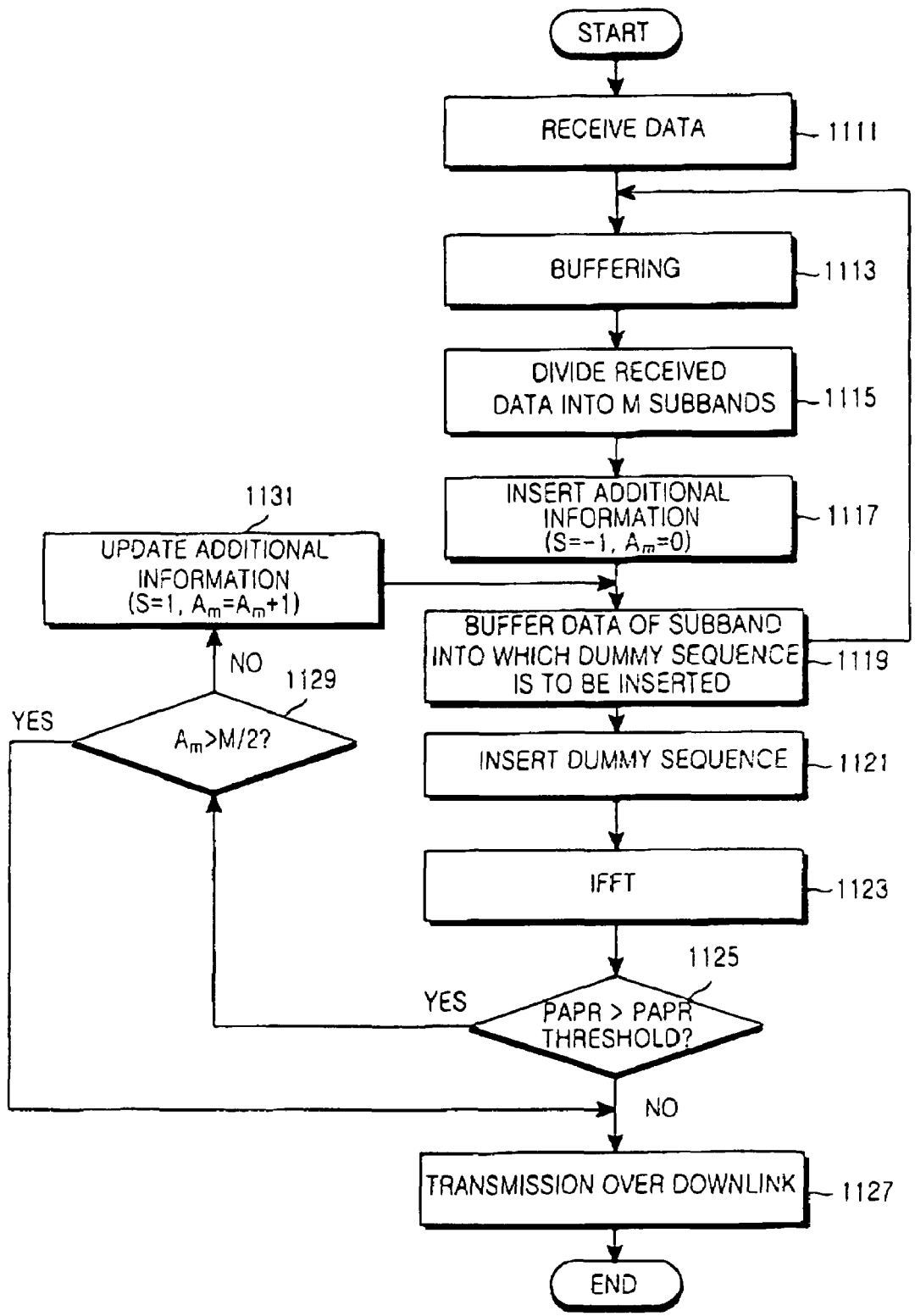
FIG. 11 is a flowchart illustrating a data transmission procedure of an OFDM communication system according to an embodiment of the present invention.

FIG. 11 is a flowchart illustrating a data transmission procedure of an OFDM communication system according to an embodiment of the present invention. Referring to FIG. 11, when data is input in step 1111, a transmitter of the OFDM communication system proceeds to step 1113. Herein, it will be assumed that a length of the received data is L. In step 1113, the transmitter buffers the received data. In step 1115, the transmitter divides the received data into a predetermined number M of subbands, and then proceeds to step 1117. In this case, each of the M subbands becomes L/M in length. In step 1117, the transmitter inserts additional information, i.e., sign bits and address bits, into the M subbands. Here, the additional information is P in length, the sign bit S=−1, and the address bits $A_m$=0. The steps 1119 and 1121 are bypassed herein in an initial process. That is, in the initial process, the transmitter proceeds from the step 1117 to step 1123. A detailed description of the steps 1119 and 1121 will be made later.

In step 1123, the transmitter performs an IFFT operation on the signal obtained by inserting the additional information into the M subbands. In step 1125, the transmitter determines whether a PAPR value of the IFFT-transformed signal exceeds a predetermined PAPR threshold. If it is determined that the PAPR value of the IFFT-transformed signal does not exceed the PAPR threshold, the transmitter proceeds to step 1127. In step 1127, the transmitter RF-processes the IFFT-transformed signal, transmits the RF-processed signal over a downlink, and then ends the procedure.

However, if It is determined in step 1125 that the PAPR value of the IFFT-transformed signal exceeds the PAPR threshold, the transmitter proceeds to step 1129. In step 1129, the transmitter determines whether a value of the address bits $A_m$ exceeds M/2. If a value of the address bits $A_m$ exceeds M/2, the transmitter returns to step 1127. If it is determined in step 1129 that a value of the address bits $A_m$ does not exceed M/2, the transmitter proceeds to step 1131. In step 1131, the transmitter updates the sign bit to S=1 and the address bits to $A_m=A_m+1$, and then proceeds to step 1119.

In step 1119, the transmitter buffers data of the last subband to an $((M+1)-A_m)^{th}$ subband, and then proceeds to step 1121. In step 1121, the transmitter inserts a dummy sequence into the last subband to the $((M+1)-A_m)^{th}$ subband, and then proceeds to step 1123. Through this procedure, it is possible to minimize PAPR by inserting a dummy sequence into up to the subbands corresponding to ½ or shorter of the length L of the input data.

Figure 12:
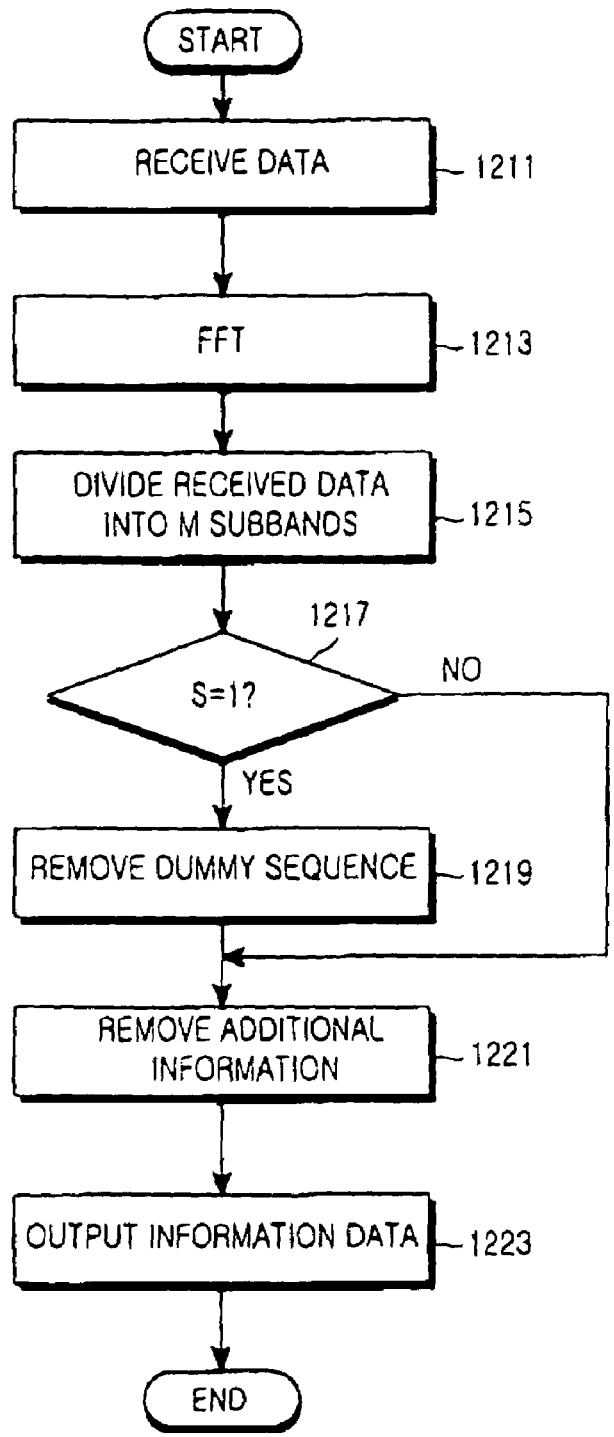
FIG. 12 is a flowchart illustrating a data reception procedure of an OFDM communication system according to an embodiment of the present invention.

FIG. 12 is a flowchart illustrating a data reception procedure of an OFDM communication system according to an embodiment of the present invention. Referring to FIG. 12, when data is received in step 1211, a receiver of the OFDM communication system proceeds to step 1213, where the receiver performs an FFT operation on the received data. In step 1215, the receiver divides length-L data obtained by excluding length-P additional information from the FFT-transformed data into M subbands. In step 1217, the receiver determines whether a sign bit in the additional information is set to S=1. If the sign bit is not set to S=1, the receiver proceeds to step 1221.

However, if it is determined in step 1217 that the sign bit is set to S=1, the receiver proceeds to step 1219. Because S=1 indicates that a dummy sequence is inserted, the receiver reads a value of address bits $A_m$ from the additional information to remove a dummy sequence from the dummy sequence-inserted subband, and then proceeds to step 1221. In step 1221, the receiver removes the additional information, and then proceeds to step 1223. In step 1223, the receiver outputs the additional information-removed signal as final information data, and then ends the procedure.

As described above, when PAPR of a transmission signal exceeds a predetermined PAPR threshold in an OFDM communication system, the present invention inserts a dummy sequence into a part of the transmission signal before transmission, thereby minimizing PAPR. The minimization of PAPR contributes to maximization of transmission efficiency of the OFDM communication system.

While the present invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmission apparatus for minimizing a peak-to-average power ratio (PAPR) in an orthogonal frequency division multiplexing (OFDM) communication system, comprising:
    a subband divider for dividing information data subcarrier signals into subband signals;
    an additional information inserter for inserting into the information data subcarrier signals additional information subcarrier signals including a sign bit indicating whether a dummy sequence is inserted and an address bit indicating a position of a subband into which the dummy sequence is to be inserted;
    a dummy sequence inserter for inserting the dummy sequence into a subband corresponding to the position among the subband signals;
    an inverse fast Fourier transform (IFFT) block for generating a first OFDM symbol signal by IFFT-transforming the additional information subcarrier signals and dummy sequence-free subband signals, and generating a second OFDM symbol signal by IFFT-transforming the additional information subcarrier signals and dummy sequence-inserted subband signals;
    a controller for determining a sign bit value and an address bit value of the additional information when a PAPR value of the first OFDM symbol signal exceeds a predetermined PAPR threshold, and controlling the dummy sequence inserter to insert the dummy sequence into a subband in a position corresponding to the address bit value among the subband signals so that the second OFDM symbol signal is transmitted over a downlink; and
    a transmitter for transmitting at least one of the first and second signals output from the IFFT block over the down link.

2. The transmission apparatus of claim 1, wherein the controller performs a control operation so that the first OFDM symbol signal is transmitted over the downlink when the PAPR value of the first OFDM symbol signal is less than the PAPR threshold.

3. The transmission apparatus of claim 1, wherein the dummy sequence includes a complementary sequence.

4. The transmission apparatus of claim 1, wherein the dummy sequence includes a null sequence.

5. The transmission apparatus of claim 1, wherein the controller randomly determines the position of the subband into which the dummy sequence is inserted.

6. A reception apparatus for minimizing a peak-to-average power ratio (PAPR) in an orthogonal frequency division multiplexing (OFDM) communication system, comprising:
    a receiver for receiving a radio frequency (RF) signal, converting the received RF signal into a baseband signal, and FFT (Fast Fourier Transform)-transforming the baseband signal;
    an additional information detector for detecting, from the FFT-transformed signal, additional information subcarrier signals including a sign bit indicating whether a dummy sequence is inserted and an address bit indicating a position of a subband into which the dummy sequence is inserted;
    a dummy sequence remover for classifying information data subcarrier signals except for the additional information subcarrier signals into subband signals, outputting the subband signals when the sign bit indicates non-insertion of the dummy sequence, and removing the dummy sequence from a subband corresponding to the address bit when the sign bit indicates insertion of the dummy sequence; and
    an additional information remover for removing the additional information subcarrier signals from a signal output from the dummy sequence remover.

7. The reception apparatus of claim 6, wherein the dummy sequence includes a complementary sequence.

8. The reception apparatus of claim 6, wherein the dummy sequence includes a null sequence.

9. A signal-transmission method for minimizing a peak-to-average power ratio (PAPR) in an orthogonal frequency division multiplexing (OFDM) communication system, comprising the steps of:
    dividing information data subcarrier signals into subband signals;
    inserting into the information data subcarrier signals additional information subcarrier signals including a sign bit indicating whether a dummy sequence is inserted and an address bit indicating a position of a subband into which the dummy sequence is to be inserted;
    inserting the dummy sequence into a subband corresponding to the position among the subband signals;
    generating a first OFDM symbol signal by IFFT (Inverse Fast Fourier Transform)-transforming the additional information subcarrier signals and dummy sequence-free subband signals;
    generating a second OFDM symbol signal by IFFT-transforming the additional information subcarrier signals and dummy sequence-inserted subband signals; and
    determining a sign bit value and an address bit value of the additional information when a PAPR value of the first OFDM symbol signal exceeds a predetermined PAPR threshold, and performing a control operation for inserting the dummy sequence into a subband in a position corresponding to the address bit value among the subbands so that the second OFDM symbol signal is transmitted over a downlink.

10. The transmission method of claim 9, further comprising the step of performing a control operation so that the first OFDM symbol signal is transmitted over the downlink when the PAPR value of the first OFDM symbol signal is less than the PAPR threshold.

11. The transmission method of claim 9, wherein the dummy sequence includes a complementary sequence.

12. The transmission method of claim 9, wherein the dummy sequence includes a null sequence.

13. The transmission method of claim 9, wherein the position of the subband into which the dummy sequence is inserted is randomly determined.

14. A reception method for minimizing a peak-to-average power ratio (PAPR) in an orthogonal frequency division multiplexing (OFDM) communication system, comprising the steps of:

receiving a radio frequency (RF) signal, converting the received RF signal into a baseband signal, and then FFT (Fast Fourier Transform)-transforming the baseband signal;

detecting, from the FFT-transformed signal, additional information subcarrier signals including a sign bit indicating whether a dummy sequence is inserted and an address bit indicating a position of a subband into which the dummy sequence is inserted;

classifying information data subcarrier signals except for the additional information subcarrier signals into subband signals;

removing the additional information subcarrier signals when the sign bit indicates non-insertion of the dummy sequence, and outputting the additional information-removed signal as an information data signal; and removing the dummy sequence from a subband corresponding to the address bit when the sign bit indicates insertion of the dummy sequence, removing the additional information subcarrier signals, and outputting the result signal as an information data signal.

15. The reception method of claim 14, wherein the dummy sequence includes a complementary sequence.

16. The reception method of claim 14, wherein the dummy sequence includes a null sequence.

17. A signal-transmission apparatus for minimizing a peak-to-average power ratio (PAPR) in an orthogonal frequency division multiplexing (OFDM) communication system, comprising:

a subband divider for dividing information data subcarrier signals into subband signals;

an additional information inserter for inserting into the information data subcarrier signals additional information subcarrier signals including a sign bit indicating whether a dummy sequence is inserted and an address bit indicating a position of a subband into which the dummy sequence is to be inserted;

a dummy sequence inserter for inserting the dummy sequence into the last subband to a subband corresponding to the position among the subband signals;

an inverse fast Fourier transform (IFFT) block for generating a first OFDM symbol signal by IFFT-transforming the additional information subcarrier signals and dummy sequence-free subband signals, and generating a second OFDM symbol signal by IFFT-transforming the additional information subcarrier signals and dummy sequence-inserted subband signals;

a controller for determining a sign bit value and an address bit value of the additional information when a PAPR value of the first OFDM symbol signal exceeds a predetermined PAPR threshold, and then performing a control operation for inserting the dummy sequence into a last subband to a subband in a position corresponding to the address bit value among the subband signals so that the second OFDM symbol signal is transmitted over a downlink; and a transmitter for transmitting the first and second OFDM symbol signals output from the IFFT block over the downlink.

18. The transmission apparatus of claim 17, wherein the controller performs a control operation so that the first OFDM symbol signal is transmitted over the downlink when the PAPR value of the first OFDM symbol signal is less than the PAPR threshold.

19. The transmission apparatus of claim 17, wherein the dummy sequence includes a complementary sequence.

20. The transmission apparatus of claim 17, wherein the dummy sequence includes a null sequence.

21. The transmission apparatus of claim 17, wherein the address bit has a value being less than half of the number of the subbands.

22. A reception apparatus for minimizing a peak-to-average power ratio (PAPR) in an orthogonal frequency division multiplexing (OFDM) communication system, comprising:

a receiver for receiving a radio frequency (RF) signal, converting the received RF signal into a baseband signal, and then FFT (Fast Fourier Transform)-transforming the baseband signal;

an additional information detector for detecting, from the FFT-transformed signal, additional information subcarrier signals including a sign bit indicating whether a dummy sequence is inserted and an address bit indicating a position of a subband into which the dummy sequence is inserted;

a dummy sequence remover for classifying information data subcarrier signals excepting the additional information subcarrier signals into subband signals, outputting the subband signals to the additional information remover when the sign bit indicates non-insertion of a dummy sequence, and removing the dummy sequence from the last subband to a subband corresponding to the address bit when the sign bit indicates insertion of the dummy sequence; and an additional information remover for removing the additional information subcarrier signals from a signal output from the dummy sequence remover.

23. The reception apparatus of claim 22, wherein the dummy sequence includes a complementary sequence.

24. The reception apparatus of claim 22, wherein the dummy sequence includes a null sequence.

25. A signal-transmission method for minimizing a peak-to-average power ratio (PAPR) in an orthogonal frequency division multiplexing (OFDM) communication system, comprising the steps of:

dividing information data subcarrier signals into subband signals;

inserting into the information data subcarrier signals additional information subcarrier signals including a sign bit indicating whether a dummy sequence is inserted and an address bit indicating a position of a subband into which the dummy sequence is to be inserted;

inserting the dummy sequence into a last subband to a subband corresponding to the position among the subband signals;

generating a first OFDM symbol signal by IFFT (Inverse Fast Fourier Transform)-transforming the additional information subcarrier signals and dummy sequence-free subband signals;

generating a second OFDM symbol signal by IFFT-transforming the additional information subcarrier signals and dummy sequence-inserted subband signals; and determining a sign bit value and an address bit value of the additional information when a PAPR value of the first OFDM symbol signal exceeds a predetermined PAPR threshold, and then performing a control operation for inserting the dummy sequence into the last subband to a subband in a position corresponding to the address bit value among the subband signals so that the second OFDM symbol signal is transmitted over a downlink.

26. The transmission method of claim 25, further comprising the step of performing a control operation so that the first OFDM symbol signal is transmitted over the downlink when the PAPR value of the first OFDM symbol signal is less than the PAPR threshold.

27. The transmission method of claim 25, wherein the dummy sequence includes a complementary sequence.

28. The transmission method of claim 25, wherein the dummy sequence includes a null sequence.

29. The transmission method of claim 25, wherein the address bit has a value being less than half the number of the subbands.

30. A reception method for minimizing a peak-to-average power ratio (PAPR) in an orthogonal frequency division multiplexing (OFDM) communication system, comprising the steps of:

receiving a radio frequency (RF) signal, converting the received RF signal into a baseband signal, and then FFT (Fast Fourier Transform)-transforming the baseband signal;

detecting, from the FFT-transformed signal, additional information subcarrier signals including a sign bit indicating whether a dummy sequence is inserted and an address bit indicating a position of a subband into which the dummy sequence is inserted;

classifying information data subcarrier signals excepting the additional information subcarrier signals into subband signals;

removing the additional information subcarrier signals when the sign bit indicates non-insertion of the dummy sequence, and outputting the additional information-removed signal as an information data signal; and removing the dummy sequence from the last subband to a subband corresponding to the address bit when the sign bit indicates insertion of the dummy sequence, removing the additional information subcarrier signals, and outputting the result signal as an information data signal.

31. The reception method of claim 30, wherein the dummy sequence includes a complementary sequence.

32. The reception method of claim 30, wherein the dummy sequence includes a null sequence.

33. A transmission method for minimizing a peak-to-average power ratio (PAPR) in an orthogonal frequency division multiplexing (OFDM) communication system, comprising the steps of:

(a) dividing an input data block into a plurality of sub-data blocks;

(b) IFFT (Inverse Fast Fourier Transform)-transforming data in the divided sub-data blocks;

(c) inserting a dummy sequence into one of the sub-data blocks when a PAPR value of the IFFT-transformed data exceeds a PAPR threshold, and generating a first block into which a sign bit, an address bit, a dummy sequence, and data are inserted, by adding an additional information block including the sign bit indicating insertion of the dummy sequence and the address bit indicating a position of a dummy sequence-inserted block to the dummy sequence-inserted block and a data-inserted block; and (d) sequentially inserting dummy sequences into the sub-data blocks by repeating the steps (a) to (c) until a PAPR value of data obtained by IFFT-transforming data in the first block becomes less than the PAPR threshold.

34. The transmission method of claim 33, wherein the number of sub-data blocks into which the dummy sequences are inserted is less than ½ of the total number of sub-data blocks.

35. The transmission method of claim 33, wherein the dummy sequence includes a complementary sequence.

36. The transmission method of claim 33, wherein the dummy sequence includes a null sequence.

* * * * *